United States Patent [19]

Yatsuka et al.

[11] Patent Number: 5,274,380
[45] Date of Patent: Dec. 28, 1993

[54] FM-CW RADAR

[75] Inventors: Hiroyuki Yatsuka; Toshiyuki Morita, both of Kawasaki, Japan

[73] Assignee: Fujitsu Limited, Kawasaki, Japan

[21] Appl. No.: 31,858

[22] Filed: Mar. 16, 1993

[30] Foreign Application Priority Data

Mar. 17, 1992 [JP] Japan .................. 4-060006

[51] Int. Cl.[5] .............................................. G01S 13/93
[52] U.S. Cl. ........................................ 342/70; 342/71; 342/100
[58] Field of Search ............... 342/70, 71, 72, 98, 342/100, 101, 128, 200

[56] References Cited

U.S. PATENT DOCUMENTS

| | | | |
|---|---|---|---|
| 3,893,114 | 7/1975 | Yamanaka et al. | 342/72 |
| 3,974,501 | 8/1976 | Ritzie | 342/128 |
| 4,003,049 | 1/1977 | Sterzer et al. | 342/43 |
| 4,109,247 | 8/1978 | Kaplan | 342/50 |
| 4,348,675 | 9/1982 | Senzaki et al. | 342/71 |
| 4,901,083 | 2/1990 | May et al. | 342/128 |
| 5,087,918 | 2/1992 | May et al. | 342/85 |
| 5,134,411 | 7/1992 | Adler | 342/130 |
| 5,181,037 | 1/1993 | Komatsu | 342/70 |

*Primary Examiner*—John B. Sotomayor
*Attorney, Agent, or Firm*—Nikaido, Marmelstein, Murray & Oram

[57] ABSTRACT

A switching type FM-CW radar, the type of FM-CW radar improved to reduce FM-AM conversion noise, is further improved to reduce interference by radar waves from other vehicles and echo waves returned from them. A switching circuit is provided at the transmitter side, and its switching frequency is set at a different value for each individual vehicle. Furthermore, the switching frequency of an interfering wave is measured, in accordance with which the switching frequency of the switching circuit is changed.

6 Claims, 11 Drawing Sheets

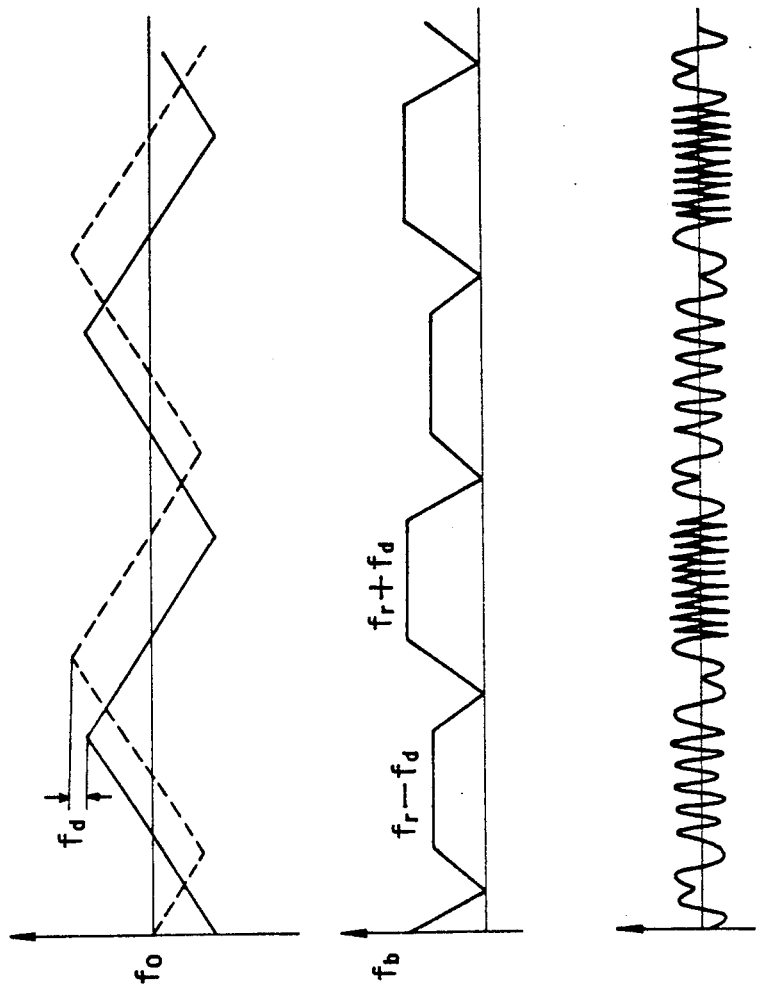

FM-CW RADAR

BACKGROUND OF THE INVENTION

1. Field of the Invention

The present invention relates to a radar mounted in a vehicle and used to avoid collisions by measuring the distance and relative velocity with respect to other vehicles, and more particularly to an FM-CW radar capable of preventing malfunctioning of radar due to interference by radar signals from FM-CW radars mounted in other vehicles.

In recent years, traffic deaths due to vehicle collisions, etc., have been increasing year by year with increasing numbers of vehicles on the road. To cope with this situation, it has been proposed to equip vehicles with a low-cost safety system, such as a vehicle-to-vehicle distance monitoring system, that gives the driver an advance warning of an impending collision in order to reduce vehicle collision accidents. The present invention is concerned with improvements in a radar device used in such a safety system.

2. Description of the Related Art

FM-CW radar has been known as a type of radar system that can measure the distance and relative velocity of target objects. Since the FM-CW radar can measure distance and relative velocity using simple signal processing circuitry and allows the transmitter and receiver to be made simple in construction, this type of radar system has been used as a vehicular anticollision on-board radar of which compact size and low cost are particularly demanded.

The principle of FM-CW radar is as follows. The output of an oscillator is frequency-modulated by a triangular wave of several hundred hertz, and the frequency-modulated wave is transmitted. An echo signal from a target is received, and the received signal is frequency-demodulated using the frequency-modulated wave as the local frequency. The received echo wave from the target is shifted in frequency from the transmitted signal (producing a beat frequency) according to the distance between the radar and the target and the Doppler shift due to the relative velocity of the target. The frequency shift serves as a measure of the distance and the relative velocity.

When this type of radar is used as a vehicular on-board radar, since the distance is about 100 meters at the longest and the relative velocity about 100 km/h at most, the maximum frequency deviation to ensure sufficient distance-measuring accuracy would be about 100 MHz, and short-wavelength radiowaves, for example, in the millimeter wave region above 30 GHz, would be suitable for the transmitted frequency in order to ensure sufficient accuracy of relative velocity measurement.

If many vehicles on the road come to be equipped with such FM-CW radars, there can arise situations where radar signals from different FM-CW radars interfere with one another. For example, when a radar-mounted car A and a radar-mounted car B are running side by side, radiating radar signals toward another car, neighboring-car-interference may be caused by both echo signals being received by one or other of the radar-mounted cars. Furthermore, if there is an oncoming car C mounted with a radar radiating a radar signal toward the radar-mounted car B, oncoming-car-interference may occur when the car B receives the echo signal of its own transmitted signal simultaneously with the radar signal from the car C. Such interference causes an erroneous measurement of the distance and relative velocity of the target car.

In conventional millimeter wave FM-CW radars, since frequency modulation with a very large frequency deviation is used, as described above, an AM component having substantially the same frequency component as the modulating signal is inevitably superimposed on the frequency-modulated wave because of the slope of the voltage-controlled oscillator's oscillation frequency versus output power characteristic. This AM component is detected by a mixer (frequency converter). Since the frequency of the triangular wave for the frequency modulation is very close to the frequency of the echo signal frequency-demodulated from the reflected signal from a target object, the reception S/N ratio is degraded, and therefore, the output power of the transmitter has to be increased in order to obtain the required radar range. The noise caused by the above phenomenon is known as FM-AM conversion noise.

To overcome the above shortcoming, there is proposed a so-called switching radar system in which the transmitter wave is switched at an appropriate frequency and only an intermediate frequency based on the switching frequency is extracted using a band-pass filter.

SUMMARY OF THE INVENTION

It is accordingly an object of the invention to further improve the above-mentioned switching type FM-CW radar and enhance the reliability of radar measurement of the distance and relative velocity by reducing the radar signal interference that is caused when a plurality of vehicles mounted with FM-CW radars are running in close proximity with one another.

According to the invention, there is provided an FM-CW radar suitable for being mounted in a vehicle, comprising:

a first oscillator for generating a triangular wave of a first frequency;

a second oscillator for accepting the triangular wave generated by the first oscillator and for generating a signal of a second frequency, the signal being frequency-modulated by the triangular wave;

a third oscillator for generating a signal of a third frequency;

amplitude-modulating means for amplitude-modulating the output signal of the second oscillator by the output signal of the third oscillator;

a transmitting antenna for transmitting the output signal of the amplitude-modulating means in the form of a radiowave;

a receiving antenna for receiving a reflected wave of the radiowave transmitted from the transmitting antenna;

a first mixer for mixing the signal received by the receiving antenna with a portion of the output signal of the second oscillator;

a first band-pass filter for extracting only signal components centered around the third frequency from the output signal of the first mixer; and a second mixer for mixing the signal of the third frequency with the signal components passed through the first band-pass filter, wherein the third frequency is set at a value selected for each individual vehicle from among a plurality of values that lie within a range defined by an upper limit sufficiently lower than the second frequency and a lower limit sufficiently higher than a difference frequency between the radiowave transmitted from the transmitting antenna and the reflected wave received by the receiving antenna.

BRIEF DESCRIPTION OF THE DRAWINGS

FIGS. 1A to 1C and FIGS. 2A to 2C are diagrams for explaining the principles of prior art FM-CW radars;

DESCRIPTION OF THE PREFERRED EMBODIMENTS

Before proceeding to a detailed description of the preferred embodiments of the present invention, we will first describe the principle of FM-CW radar as well as the principle of switching type FM-CW radar with reference to the accompanying drawings.

Figures 1A, 1B, 1C:
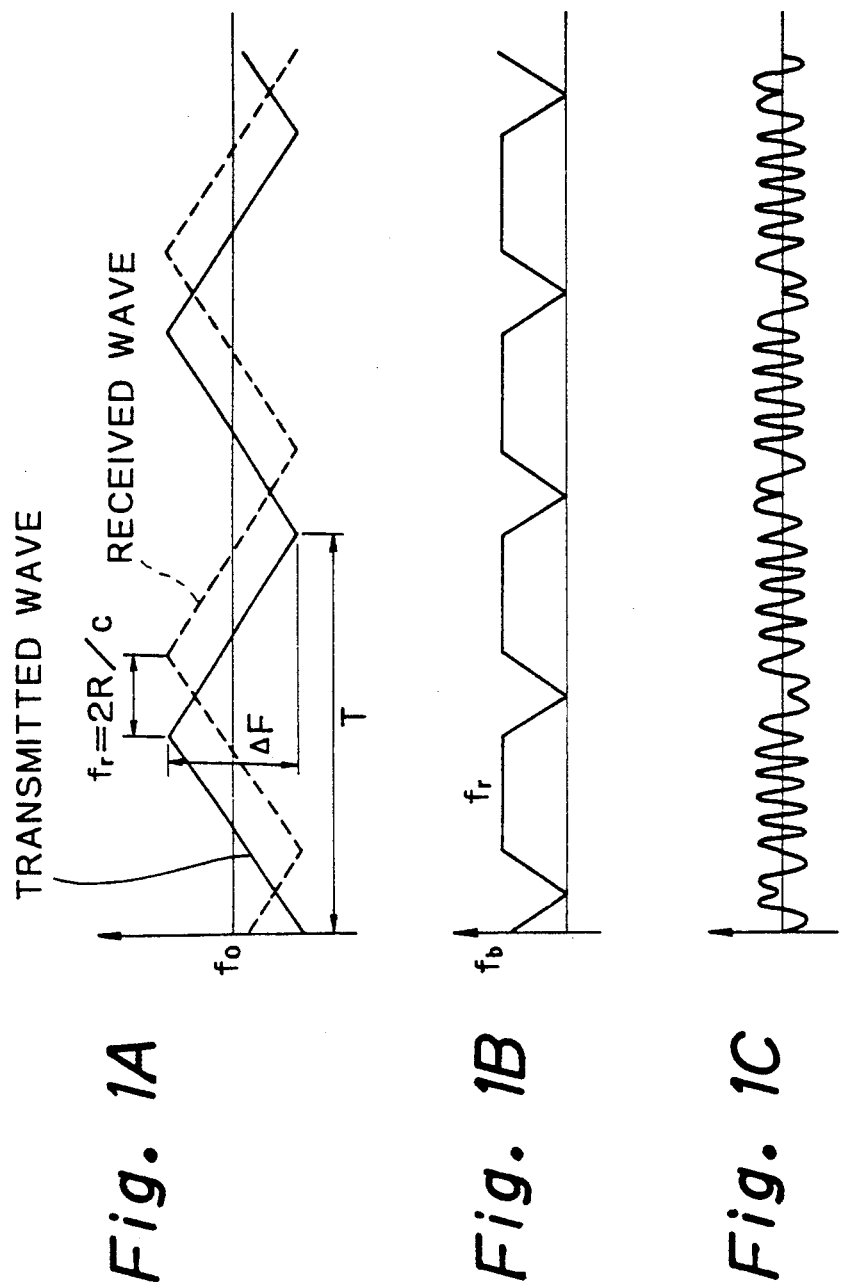

FIGS. 1A to 1C and FIGS. 2A to 2C are waveform diagrams for explaining the principles of the FM-CW radars. FIGS. 1A, 1B and 1C show the waveforms of the transmitted and received frequencies, the beat frequency, and the beat signal, respectively, when the relative velocity is 0. FIGS. 2A, 2B and 2C show the waveforms of the transmitted and received frequencies, the beat frequency, and the beat signal, respectively, when the relative velocity is v.

In FIGS. 1A and 2A, the transmitted wave is shown by a solid line and the received wave by a dashed line. The transmitted wave has a transmission center frequency $f_0$, a frequency modulation width of triangular wave $\Delta F$, and a modulation repetition period of triangular wave T. When the distance to a target is denoted as R and the velocity of radiowave propagation as C, the round-trip time $t_r$ of the radiowave to and from the target is given by $$t_r = \frac{2R}{C}$$

When the relative velocity with respect to the target is denoted as V, the beat frequency $f_b$ of the transmitted and received waves is given by $$f_b = \frac{4\Delta F \cdot T}{C} R \pm \frac{2f_0}{C} V$$

The first term on the right-hand side is called the distance frequency $f_r$, and the second term is the velocity frequency $f_d$.

The period during which the beat signal frequency is expected to stabilize is synchronized with the frequency of the triangular wave, with one period coinciding with the rising of the triangular wave and the next period coinciding with the falling thereof, and the beat signal frequency is measured during both the rising and falling periods to obtain $f_r - f_d$ and $f_r + f_d$, respectively. The sum and the difference of the two are taken to obtain $f_r$ and $f_d$ by which the distance R and the relative velocity V are determined.

Figure 3:
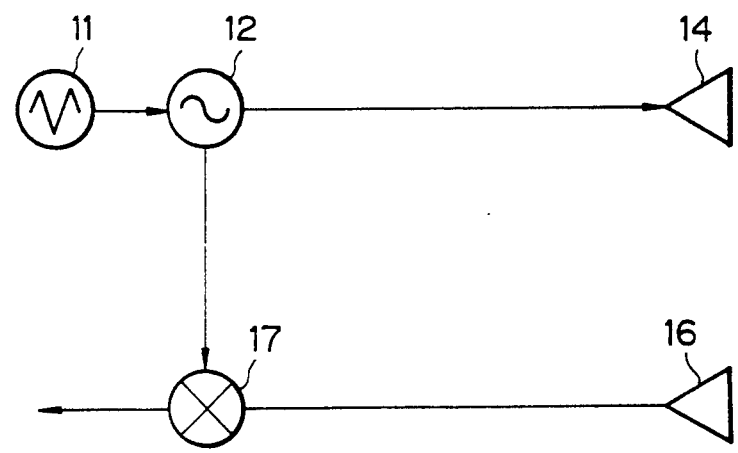
FIG. 3 is a diagram showing the configuration of a prior art FM-CW radar.

Referring now to FIG. 3, the basic configuration of the prior art FM-CW radar will be described.

In FIG. 3, the reference numeral 11 is a modulating signal generator that generates a triangular wave signal for frequency modulation, the numeral 12 is a voltage-controlled oscillator that outputs a radar signal modulated by the triangular wave signal, the numeral 14 is a transmitting antenna for effectively radiating the radar signal in a designated direction, the numeral 16 is a receiving antenna for receiving echo signals from target objects (obstacles), and the numeral 17 is a frequency converter that mixes the signal received by the receiving antenna 16 and the signal output from the voltage-controlled oscillator 12 to produce a beat signal representing the sum and difference between them.

Figure 4:
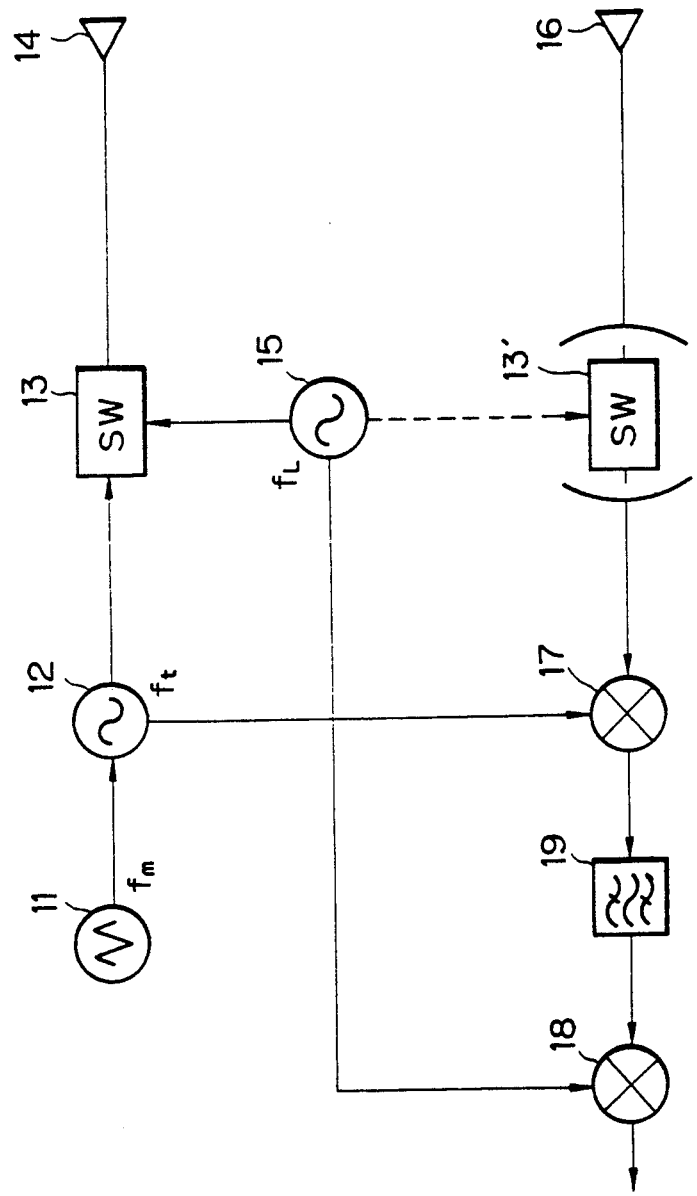
FIG. 4 is a diagram showing the configuration of an improved type of prior art FM-CW radar.
Figure 5A:
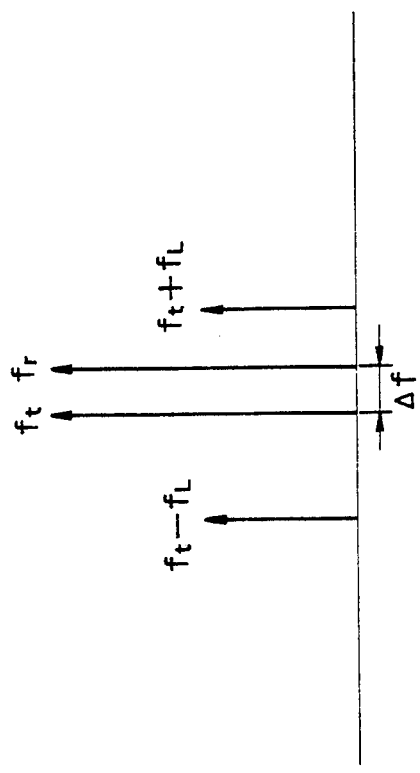
FIGS. 5A and 5B are diagrams for explaining signal spectra obtained from the improved type of prior art FM-CW radar.
Figure 5B:
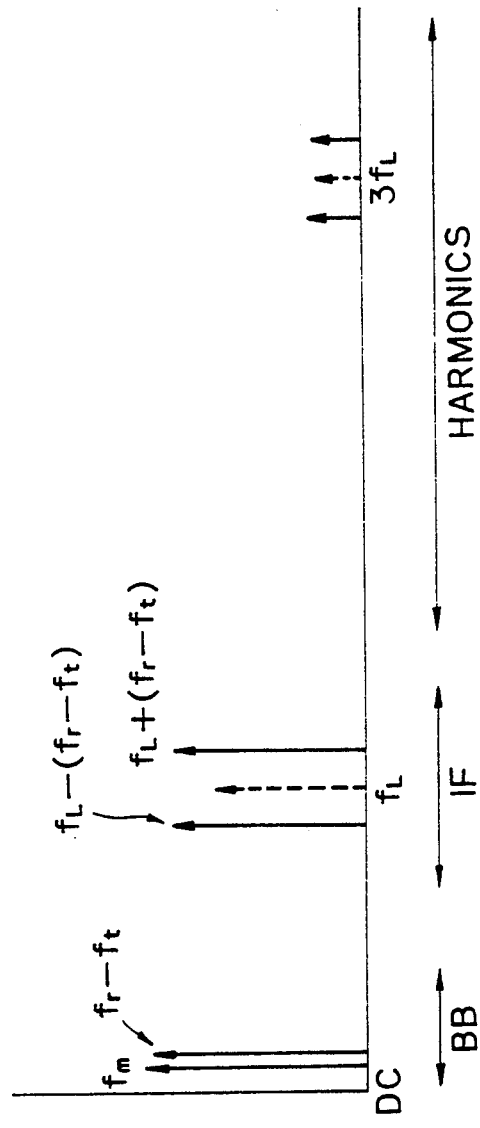

FIG. 4 is a diagram showing the basic configuration of an FM-CW radar employing the prior art switching radar technique that is capable of eliminating the previously mentioned FM-AM conversion noise. FIGS. 5A and 5B depict frequency spectra for explaining the operation of this type of radar.

In FIG. 4, the reference numeral 11 is a modulating signal generator for generating a triangular wave signal, 12 is a voltage-controlled oscillator, 13 is a switching circuit, 14 is a transmitting antenna, 15 is a modulating signal generator for generating a switching signal, 16 is a receiving antenna, 17 and 18 are frequency converters, and 19 is a band-pass filter.

The modulating signal generator 11 generates a triangular wave signal for frequency modulation. The voltage-controlled oscillator 12 generates a frequency-modulated signal in the millimeter wave region which is transmitted from the radar. The switching circuit (modulating circuit) 13 amplitude-modulates or phase-modulates the signal fed from the voltage-controlled oscillator 12 by the modulating signal generated by the modulating signal generator 15. The transmitting antenna 14 effectively radiates the output signal of the switching circuit (modulating circuit) 13 into space. The modulating signal generator 15 generates the modulating signal that is supplied to the switching circuit (modulating circuit) 13 for signal modulation. The receiving antenna 16 effectively intercepts echo signals reflected from targets. The frequency converter 17 mixes the output signal of the voltage-controlled oscillator 12 and the signal received by the receiving antenna 16 to produce the required signal. The band-pass filter 19 selectively passes only those portions of the output of the frequency converter 17 that fall within the vicinity of the frequency of the modulating signal generator 15. The frequency converter 18 mixes the output signal of the frequency converter 17 and the signal generated by the modulating signal generator 15 to produce signal components including information on the distance and relative velocity between the radar and the target.

The operation of the radar system of FIG. 4 will now be described with reference to FIGS. 5A and 5B. The radar signal generated by the voltage-controlled oscillator 12 is amplitude-modulated by the switching circuit (modulating circuit) 13. FIG. 5A illustrates the output signal spectrum, in which $f_t$ is the frequency of the frequency-modulated radar signal output from the voltage-controlled oscillator 2, and $f_L$ is the switching frequency, while $f_t-f_L$ and $f_t+f_L$ are the sidebands produced as a result of the switching. Further, $f_r$ is the frequency of the received signal, and $\Delta f$ indicates the difference in frequency due to time delay and Doppler shift. The output signal strikes a target object, and the reflected echo signal is input to the receiver with the difference in frequency introduced therein due to the Doppler frequency shift corresponding to the relative velocity between the radar and the target and the time delay corresponding to the distance to the target.

Although not shown here, signals $f_r-f_L$ and $f_r+f_L$ are corresponding to the sidebands $f_t-f_L$ and $f_t+f_L$ are also received.

At the receiver, these received signals are mixed with a portion of the output signal of frequency $f_t$ of the voltage-controlled oscillator 12, and therefore, the output frequency spectrum of the frequency translator 17 is as shown in FIG. 5B, in which $f_m$ is the AM component caused due to the slope of the characteristic of the voltage-controlled oscillator 12. Since most of the AM component is supplied directly to the frequency converter 17 from the voltage-controlled oscillator 12 without passing through the switching circuit 13, signals $F_L \pm f_m$ are not output. The band-pass filter 19 passes only the signal components that lie within the range centered around the $f_L$ but not exceeding the expected maximum value of $\Delta f$, and these signal components are mixed with $f_L$ in the frequency converter 18, to obtain a signal $f_r-f_t$ that does not contain noise components in the vicinity of DC.

As shown by the reference numeral 13' in FIG. 4, the switching circuit 13 may be provided, not in the transmitter, but in the receiver on the input side of the frequency converter 17. This arrangement would be more advantageous as it suppresses the spread in the frequency spectrum of the radiowaves emitted into space.

Figure 6:
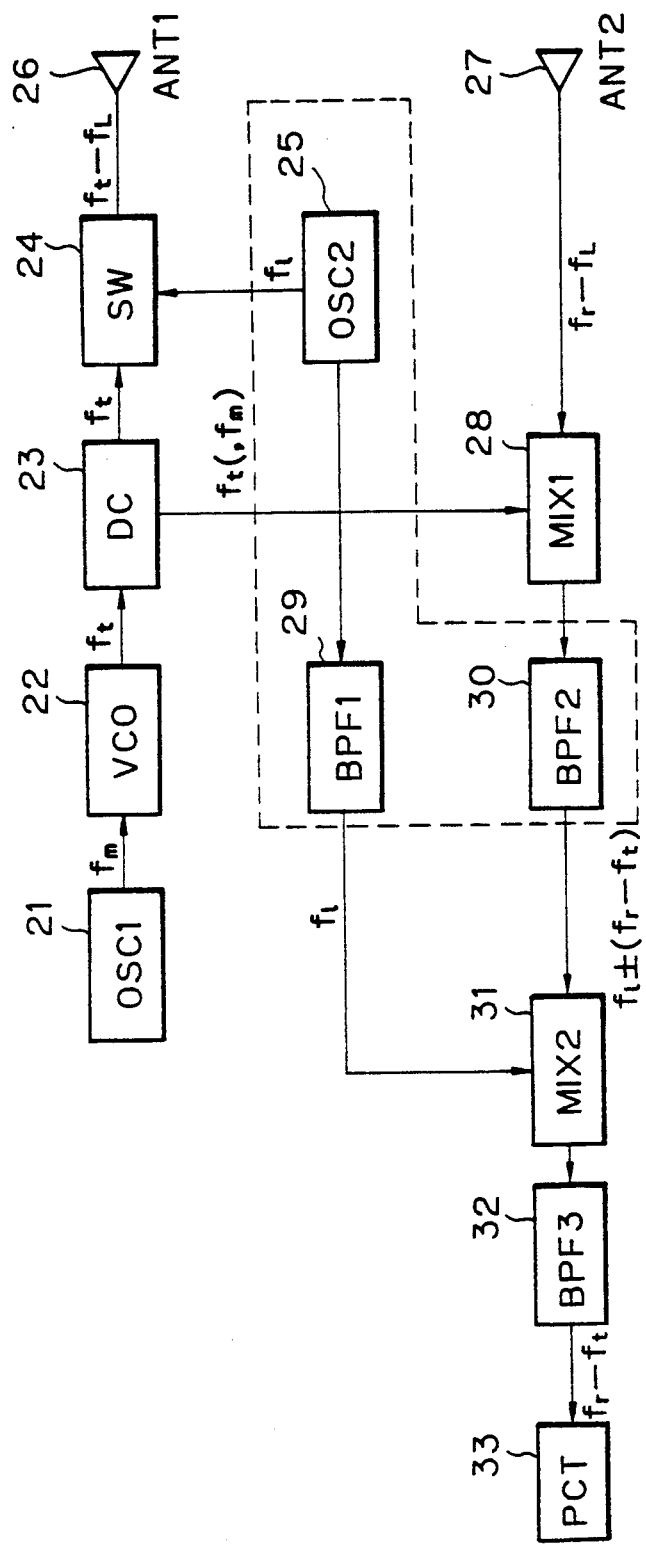
FIG. 6 is a block diagram illustrating one embodiment of the invention.

The preferred embodiments of the present invention will now be described in detail with reference to the accompanying drawings. FIG. 6 is a block diagram showing the configuration of an FM-CW radar according to one embodiment of the invention.

In FIG. 6, the reference numeral 21 is a triangular wave generator (OSC1), 22 is a voltage-controlled, variable frequency generator (VCO), 23 is a directional coupler (DC), 24 is a transmit-wave switch (SW), 25 is a switching signal generator (OSC2), 26 is a transmitting antenna (ANT1), 27 is a receiving antenna (ANT2), 28 is a first mixer (MIX1), 29 is a first band-pass filter (BPF1), 30 is a second band-pass filter (BPF2), 31 is a second mixer (MIX2), 32 is a third band-pass filter (BPF3), and 33 is a pulse counter (PCT).

The operation of the radar system of FIG. 6 will now be described. OSC1 generates a triangular wave signal of repetition frequency $f_m$ and applies it to VCO. VCO produces a transmitter signal of frequency $f_t$, frequency-modulated by the triangular wave, and supplies the frequency-modulated signal to DC. DC passes the transmitted signal to SW while diverting a portion of the signal to MIX1.

OSC2 generates a switching signal of repetition frequency $f_l$ and applies it to SW for on-off switching of the transmitter signal. The transmitter signal being switched by SW is radiated by ANT1 as a transmitted wave. When the transmitted wave strikes a target object (a vehicle), the wave is reflected back and the returned echo wave is received by ANT2. The received signal is shifted in frequency due to the time required for propagation and to the Doppler effect when the target object is moving.

Figure 7A:
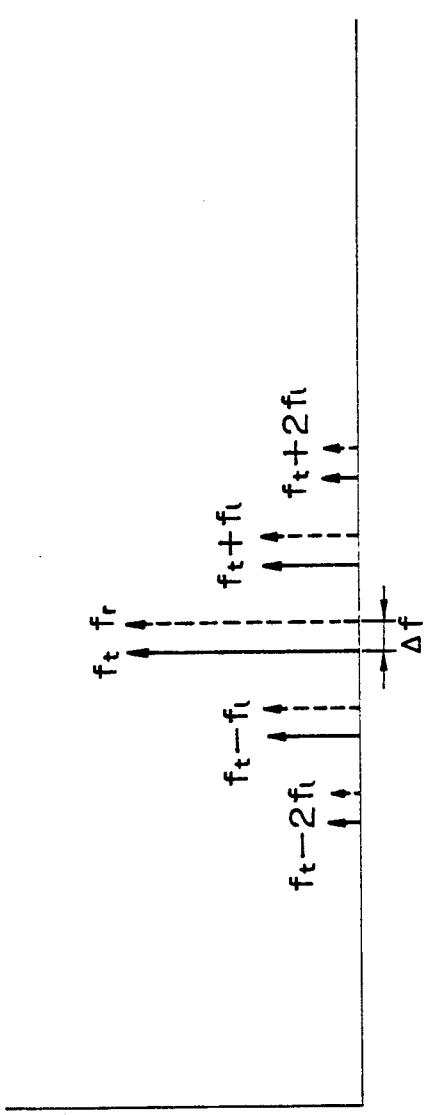
FIGS. 7A and 7B are diagrams for explaining signal spectra according to the embodiment of FIG. 6.

FIG. 7A shows the spectrum of the transmitted and received signals. The transmitted signal, indicated by the solid arrow lines, consists of $f_t$ plus other signal components such as beats of frequencies $f_t-f_l$, $f_t+f_l$, $f_t-2f_l$, $f_t+2f_l$ resulting from the switching at $f_l$. These signal components are shifted in frequency by $\Delta f$ and received as the received signal indicated by the dashed arrow lines. For example, the signal component of $f_t$ is received as $f_t + \Delta f \rightarrow f_r$.

Figure 7B:
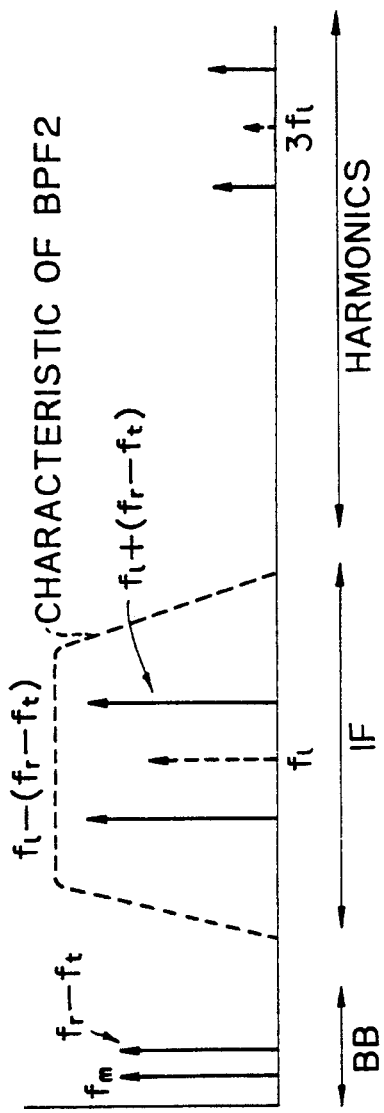

Referring back to FIG. 6, the signal received by ANT2 is coupled into MIX1 and is mixed with the portion of the transmitted signal (frequency $f_t$) diverted from DC, for conversion into a beat intermediate frequency. FIG. 7B shows the spectrum of the frequency-converted output. The spectrum consists of a baseband BB region containing the components of $f_m$ and $f_r-f_t$, an intermediate frequency IF region containing the components of $f_l-(f_r-f_t)$ and $f_l+(f_r-f_t)$, and a harmonic region containing harmonics.

The signal components in the IF region in FIG. 7B are extracted by the BPF2 of FIG. 6 and supplied to MIX2. On the other hand, BPF1 removes harmonics from the switching signal fed from OSC2 and thereby extracts the signal component of $f_l$ which is added to MIX2. MIX2 mixes the output of BPF2 with the $f_l$ component of the switching signal extracted from the output of the OSC2 by BPF1, and generates an intermediate frequency signal of the beat note representing the sum and difference between them. The intermediate frequency signal is fed to BPF3 which extracts the baseband component of $f_r-f_t$ from the output of MIX2 and supplies it to PCT. PCT counts the $f_r-f_t$ signal to detect the amount of the frequency shift.

In the section shown within the dashed line in FIG. 6, the oscillation frequency $f_l$ of OSC2 is set at a value differently selected for each individual vehicle from among a plurality of values that lie within a range defined by an upper limit sufficiently lower than the carrier frequency $f_t$ and a lower limit sufficiently higher than the expected maximum value of the baseband frequency $f_r-f_t$. The center frequency of BPF1 and BPF2 is selected to be equal to the oscillation frequency of OSC2. The pass band width of BPF2 is chosen to be greater than the expected maximum value of $f_r-f_t$. Furthermore, the oscillation frequency $f_l$ of OSC2, to be set for each vehicle, is selected, within the above limits, to have an interval that allows radar waves from other vehicles to be removed by BPF2. This arrangement serves to reduce interference by radar signals radiated from neighboring vehicles running in the same direction or vehicles approaching from the opposite direction, and thereby enhance the reliability of measurement.

Besides selecting the oscillation frequency $f_l$ of OSC2 as described above, it is also possible to reduce interference by setting the oscillation frequency $f_t$ of VCO at a different value for each vehicle. When the number of available frequencies for $f_t$ is denoted as m, and the number of frequencies available for $f_l$ within the above limits as n, the total number of possible combinations of the available frequencies is given by $$m \times n$$

This means a significant reduction in the probability of encountering a vehicle mounted with a radar with the same transmitting frequency setting.

If it is only desired to suppress the FM-AM conversion noise and increase the radar sensitivity, switching the received signal before it is fed to the receiver mixer, as described in connection with FIG. 4, would be more effective in achieving the goal than switching the transmitter signal, since the frequency spectrum of the radiowave radiated into space does not spread compared to the switched transmitted signal. However, the received signal switching method is not effective in suppressing interference, since it cannot distinguish the target wave from interfering waves because both produce the same IF. By contrast, when the transmitted signal is switched at the transmitter side before transmission, as in the embodiment of FIG. 6, the target wave can be distinguished from an interfering wave if the difference of the switching frequency of the interfering wave is greater than the pass band width of BPF2.

Figure 8:
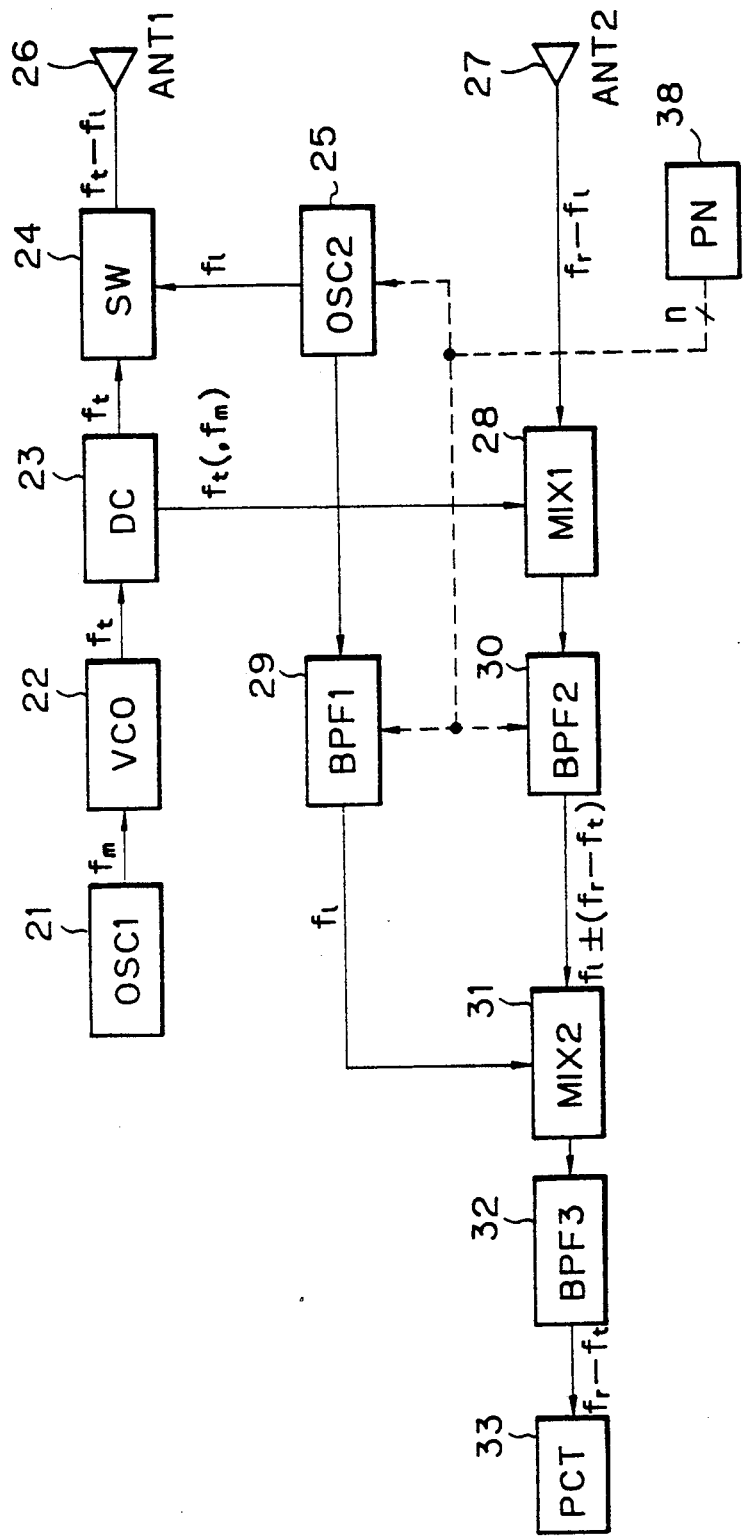
FIG. 8 is a block diagram illustrating another embodiment of the present invention.

FIG. 8 shows another embodiment of the present invention. In FIG. 8, a pseudo random noise signal generator (PN) 38 generates an n-bit parallel pseudo random noise signal. The oscillation frequency $f_I$ of the OSC2 and the center frequencies of the BPF1 and BPF2 are changed according to the pseudo random noise signal having $2^n-1$ states. If $n=3$ and a generator polynomial in PN is $X=X^3+X^2+1$, the oscillation frequency $f_I$ is changed as follows.

| PN codes | | | $f_I$ |
|---|---|---|---|
| 1 | 1 | 1 | $f_7$ |
| 1 | 1 | 0 | $f_6$ |
| 1 | 0 | 0 | $f_4$ |
| 0 | 0 | 1 | $f_1$ |
| 0 | 1 | 0 | $f_2$ |
| 1 | 0 | 1 | $f_5$ |
| 0 | 1 | 1 | $f_3$ |

The system can also be constructed to monitor the switching frequency of an interfering wave for a given time and thereby to set the switching frequency of the system and the intermediate frequency of BPF2 at a different frequency than the switching frequency of the interfering wave. In this case, a plurality of oscillators and filters may be provided and selected for use, or alternatively, an oscillator and filter whose frequencies can be varied using a control signal may be used. The embodiment shown in FIG. 8 concerns such arrangement.

Figure 9:
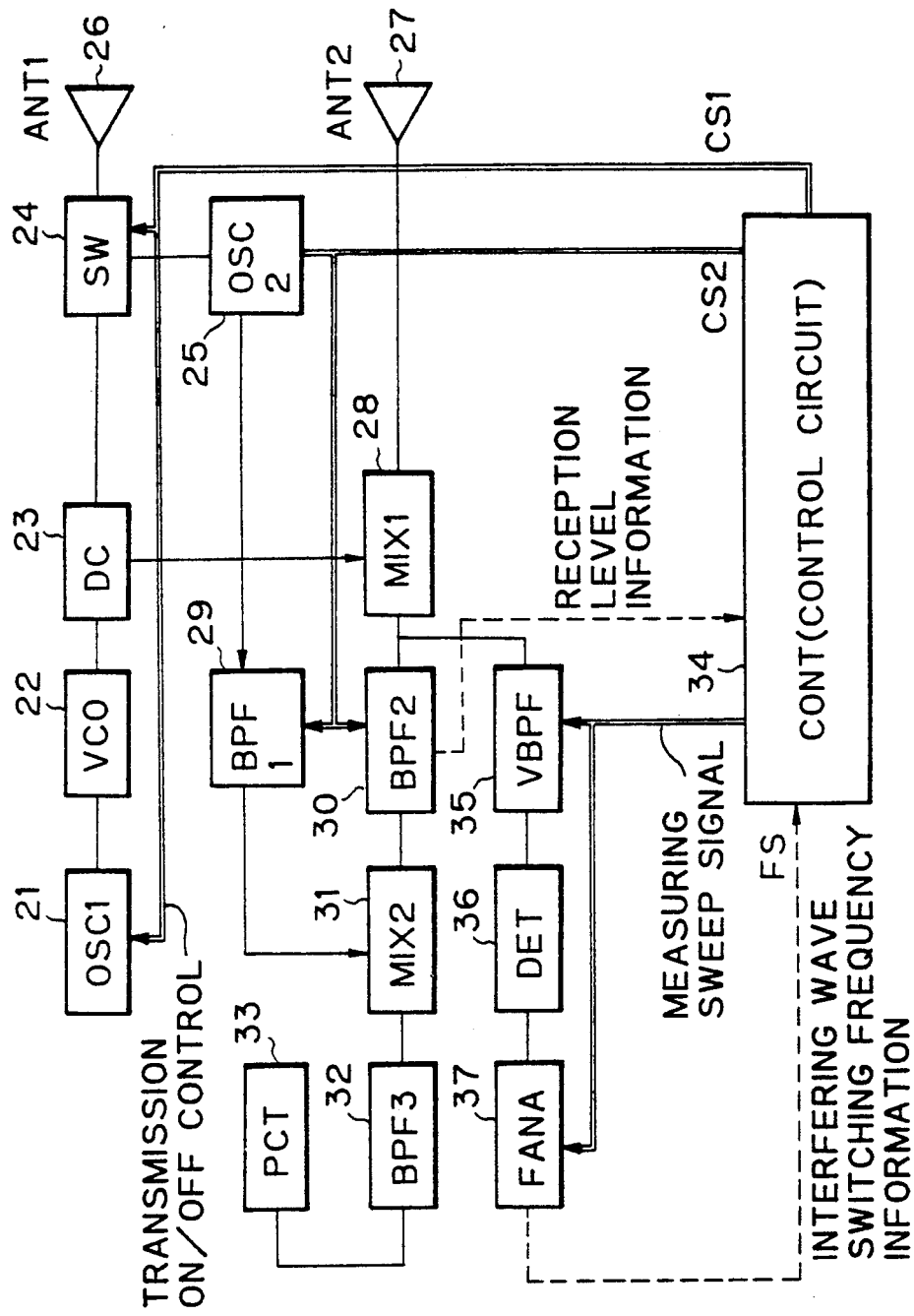
FIG. 9 is a block diagram illustrating another embodiment of the invention.

The embodiment of FIG. 9 differs from the embodiment of FIG. 6 in that circuits 35 to 37 are provided for measuring the switching frequency of an interfering wave, in that the frequency of the switching signal generated by the OSC2 and the center frequency of BPF1 and BPF2 can be varied in an interlocking relationship with each other, and in that a control circuit 34 (CONT) is provided for controlling these parts.

In FIG. 9, the reference numeral 35 designates a narrowband variable bandpass filter (VBPF) whose center frequency varies in synchronism with a measuring sweep signal from CONT that is used to vary the frequency. VBPF also has an automatic gain amplifying function. The numeral 36 is a detector (DET) for envelope-detection of the output of VBPF. The numeral 37 is a frequency analyzer (FANA) for measuring the IF of an interfering wave in synchronism with the frequency variation signal fed to VBPF; that is, the frequency area in which the interfering wave exists is determined by sweeping through the frequency range containing a plurality of choices for IF available for the system and thereby examining whether the output of DET exceeds the threshold value. FANA supplies the result of measurement, i.e., interfering wave switching frequency information, to CONT which, based on the supplied information, gives instructions to OSC2, BPF1, and BPF2 to vary their frequencies.

The operation of the embodiment of FIG. 9 will be described briefly with reference to the timing diagram of FIG. 10 and the control flow shown in FIG. 11.

Figure 10:
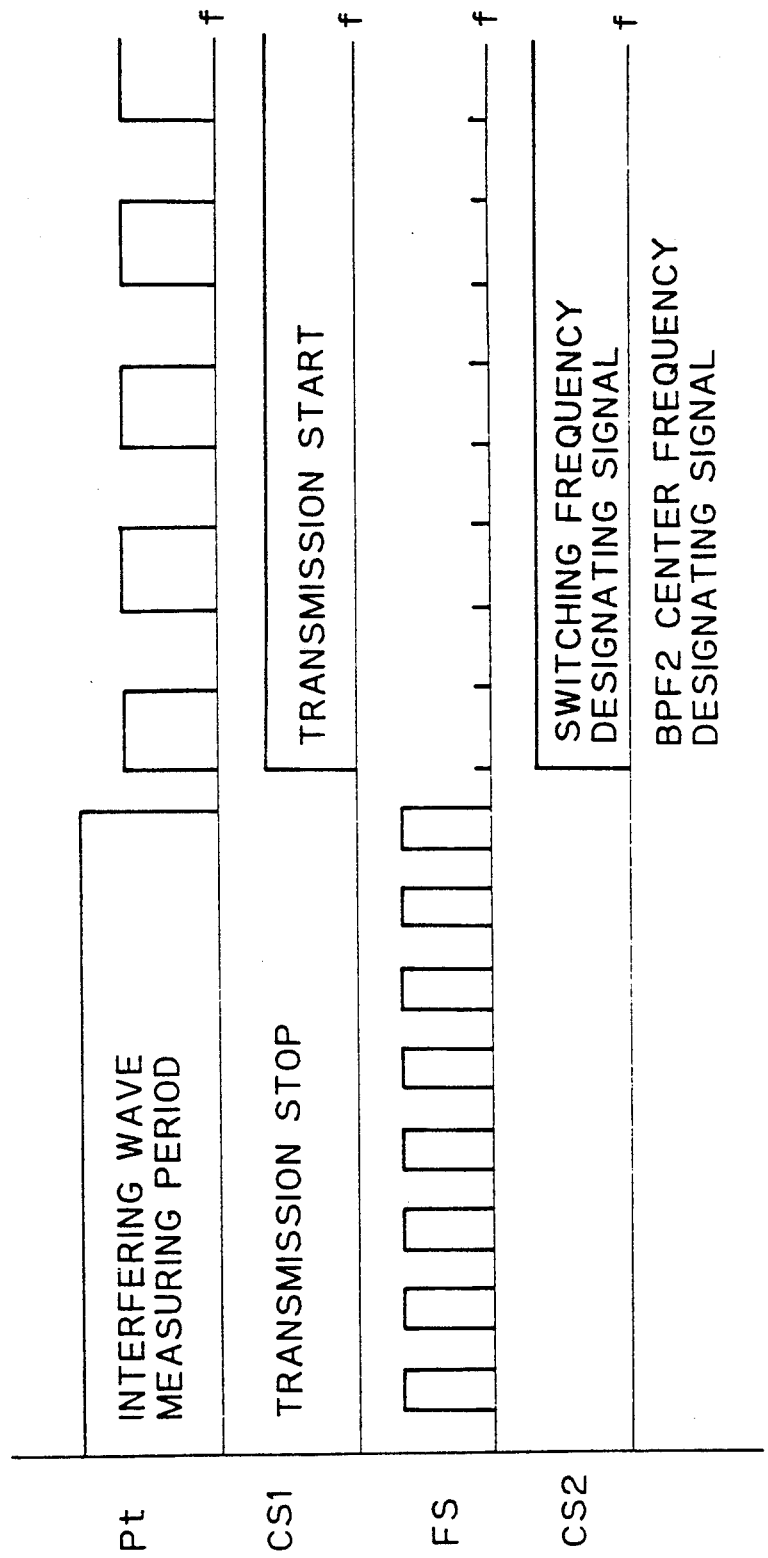
FIG. 10 is a timing diagram according to the embodiment of FIG. 9.
Figure 11:
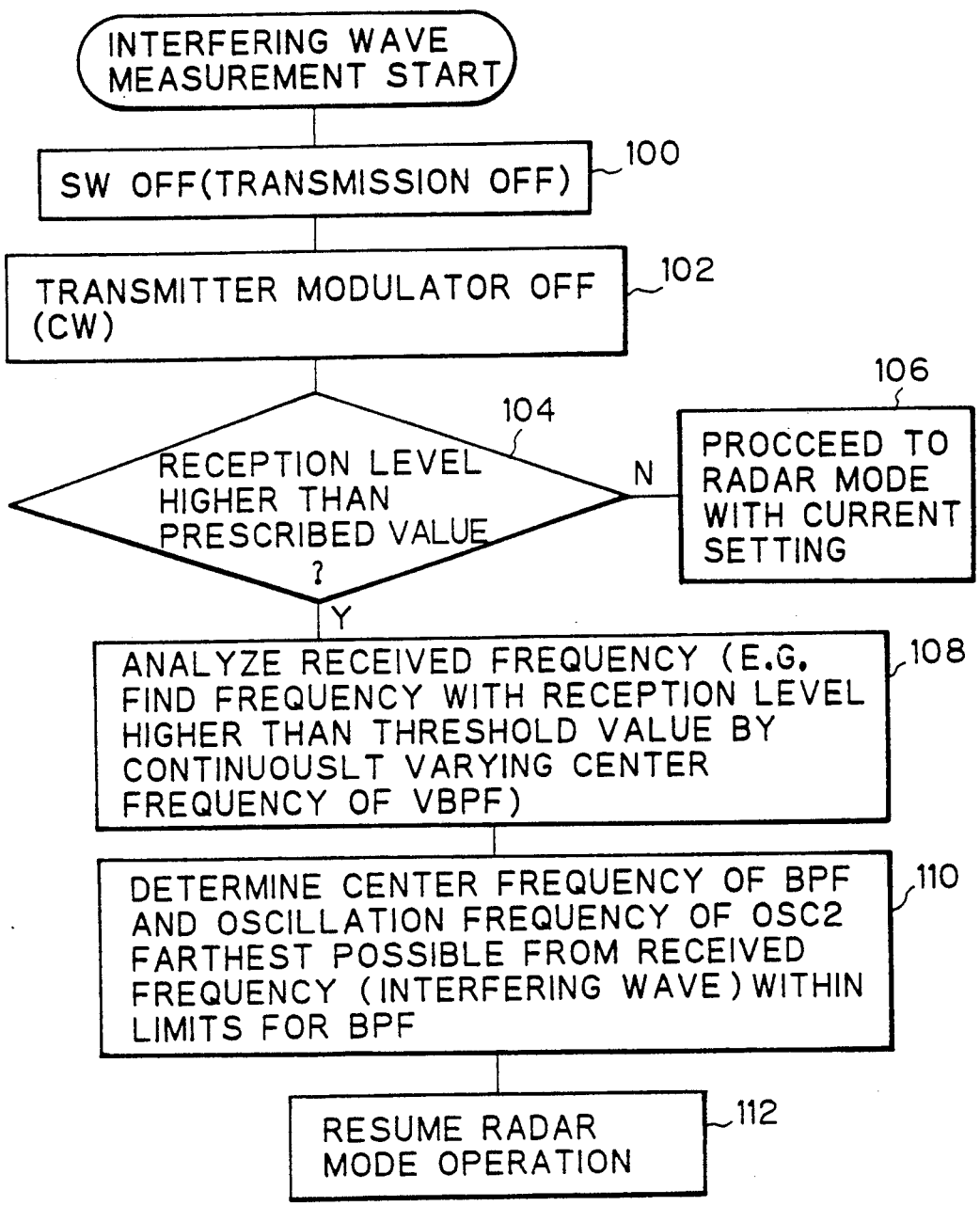
FIG. 11 is a control flow diagram according to the embodiment of FIG. 9.

The interfering wave measuring operation described in FIGS. 10 and 11 is performed periodically at a prescribed interval of time. Referring to FIG. 11, when the interfering wave measuring operation is started, SW is turned off using a control signal CS1, to stop transmission (step 100), and at the same time, the oscillation of OSC1 is stopped to suspend the frequency modulation of the generated signal in VCO; therefore, only the carrier is output (step 102).

Next, with the current CS2 setting, the reception level information in BPF2 is examined to determine whether the reception level of an interfering wave is higher than a prescribed threshold value (step 104). If the reception level is higher than the prescribed threshold value, it is decided that the reliability of the radar operation may not be maintained due to the presence of the interfering wave, and the steps beginning with 108 are performed. On the other hand, when it is determined that the reception level is below the prescribed value, it is decided that the reliability of the radar operation can be maintained, and in step 106, the process proceeds to the radar mode without changing the current operating condition setting.

When it is determined, in step 104, that the level of the interfering wave is greater than the prescribed threshold value, the process proceeds to step 108 where the center frequency of VBPF is continuously varied using the functions of VBPF, DET, and FANA to find the frequency of the signal giving a value greater than the prescribed threshold value (received frequency analysis).

Next, in step 110, the center frequency of BPF and the oscillation frequency of OSC2 are determined so that their frequencies are moved as far as possible from the interfering wave within the present limits for BPF, and using the control signal CS2, instructions are given to OSC2, BPF1, and PBF2 to set the frequencies as determined. After the operation safety is thus assured, the process proceeds to the radar mode, in step 112, to resume radar operation.

We claim:

1. An FM-CW radar suitable for being mounted in a vehicle, comprising:
   a first oscillator for generating a triangular wave of a first frequency;
   a second oscillator for accepting the triangular wave generated by the first oscillator and for generating a signal of a second frequency, the signal being frequency-modulated by the triangular wave;
   a third oscillator for generating a signal of a third frequency;
   amplitude-modulating means for amplitude-modulating the output signal of the second oscillator by the output signal of the third oscillator;

a transmitting antenna for transmitting the output signal of the amplitude-modulating means in the form of a radiowave;

a receiving antenna for receiving a reflected wave of the radiowave transmitted from the transmitting antenna;

a first mixer for mixing the signal received by the receiving antenna with a portion of the output signal of the second oscillator;

a first band-pass filter for extracting only signal components centered around the third frequency from the output signal of the first mixer; and a second mixer for mixing the signal of the third frequency with the signal components passed through the first band-pass filter, wherein the third frequency is set at a value selected differently for each individual vehicle from among a plurality of values that lie within a range defined by an upper limit sufficiently lower than the second frequency and a lower limit sufficiently higher than a difference frequency between the radiowave transmitted from the transmitting antenna and the reflected wave received by the receiving antenna.

2. An FM-CW radar according to claim 1, further comprising a random signal generator for generating a random signal, wherein the oscillation frequency of the third oscillator and the center frequency of the first band-pass filter are changed according to the random signal.

3. An FM-CW radar according to claim 1, further comprising:

interfering wave reception detecting means for detecting the presence or absence of a received interfering wave;

frequency detecting means for detecting the frequency of an interfering wave when the reception of the interfering wave is detected by the interfering wave reception detecting means; and frequency changing means for changing the oscillation frequency of the third oscillator in such a way as to avoid the effect of the interfering wave on the basis of the interfering wave frequency value detected by the frequency detecting means and for changing the center frequency of the first band-pass filter in an interlocking relationship with the oscillation frequency of the third oscillator.

4. An FM-CW radar according to claim 3, wherein the third oscillator generates a rectangular wave of the third frequency, the amplitude-modulating means includes a switch for switching on and off the output signal of the second oscillator in synchronism with the rectangular wave, the radar further comprising a second band-pass filter for removing high-frequency components from the rectangular wave and supplying the output to the second mixer as a signal of the third frequency, and the frequency changing means changes the center frequency of the second band-pass filter in an interlocking relationship with the oscillation frequency of the third oscillator.

5. An FM-CW radar according to claim 4, wherein the interfering wave reception detecting means detects the presence or absence of a received interfering wave by detecting the level of a signal passing through the first band-pass filter with the switch turned off to stop transmission and with the oscillation of the first oscillator being stopped.

6. An FM-CW radar according to claim 4, wherein the frequency detecting means includes:

a variable band-pass filter with a controllable pass band for passing only the components of the output signal of the first mixer that fall within the controlled pass band;

a detector for detecting envelope from the signal components passed through the variable band-pass filter; and a frequency analyzer for detecting a frequency by examining the detection output of the detector while continuously varying the pass band of the variable band-pass filter through a given range.

* * * * *